US011095423B2

(12) United States Patent
Maes (10) Patent No.: US 11,095,423 B2
(45) Date of Patent: Aug. 17, 2021

(54) METHOD AND APPARATUS FOR CONFIGURING OPERATION MODE OF A REMOTE TRANSCEIVER UNIT

(71) Applicant: Nokia Solutions and Networks Oy, Espoo (FI)

(72) Inventor: Jochen Maes, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 14 days.

(21) Appl. No.: 16/376,175

(22) Filed: Apr. 5, 2019

(65) Prior Publication Data

US 2019/0312716 A1    Oct. 10, 2019

(30) Foreign Application Priority Data

Apr. 6, 2018    (EP) .................................... 18166118

(51) Int. Cl.
*H04L 5/14* (2006.01)
*H04B 3/32* (2006.01)
(Continued)

(52) U.S. Cl.
CPC ............ *H04L 5/1453* (2013.01); *H04B 3/32* (2013.01); *H04L 5/14* (2013.01); *H04L 5/1461* (2013.01);
(Continued)

(58) Field of Classification Search
CPC ....... H04L 5/14; H04L 5/1453; H04L 5/1461; H04L 5/1469; H04L 7/0041;
(Continued)

(56) References Cited

U.S. PATENT DOCUMENTS 7,627,325 B2* 12/2009 McCoy ................... H04B 1/38
455/453
8,542,617 B2* 9/2013 Choi ......................... H04L 5/14
370/296
(Continued)

FOREIGN PATENT DOCUMENTS

CN        104956734 A        9/2015
CN        105393461 A        3/2016
(Continued)

OTHER PUBLICATIONS

Extended European Search Report; dated Oct. 4, 2018 for EP Application No. 18166118.2.
(Continued)

*Primary Examiner* — Michael Thier
*Assistant Examiner* — Prince A Mensah
(74) *Attorney, Agent, or Firm* — Mendelsohn Dunleavy, P.C.; Steve Mendelsohn (57) ABSTRACT

The present invention discloses a method for configuring an operation mode of a remote transceiver unit connected to an access node via a communication line, the remote transceiver unit being operable in at least two operation modes: a Time Division Duplex, TDD, mode and a full duplex, FDX, mode; the method comprising, by the access node: a) obtaining a channel characteristic derived from channel measurements performed over the communication line, b) determining the operation mode of the remote transceiver unit as the FDX mode or the TDD mode based on the channel characteristic; c) transmitting an indication indicating the determined operation mode to the remote transceiver unit.

29 Claims, 4 Drawing Sheets

(51) Int. Cl.
H04L 7/00 (2006.01)
H04L 25/02 (2006.01)
H04L 5/00 (2006.01)

(52) U.S. Cl.
CPC .......... H04L 5/1469 (2013.01); H04L 7/0041 (2013.01); H04L 25/0212 (2013.01); H04L 5/0053 (2013.01); H04L 5/0058 (2013.01); H04L 5/0092 (2013.01)

(58) Field of Classification Search
CPC . H04L 25/0212; H04L 5/0053; H04L 5/0058; H04L 5/0092; H04B 3/32; H04B 17/309; H04B 7/0619; H04B 7/2656
See application file for complete search history.

(56) References Cited

U.S. PATENT DOCUMENTS

| | | | |
|---|---|---|---|
| 2010/0254367 A1* | 10/2010 | Lim | H04L 27/2607 370/344 |
| 2011/0222445 A1* | 9/2011 | Alanara | H04L 1/0025 370/281 |
| 2015/0382207 A1 | 12/2015 | Dimou et al. | |
| 2017/0054544 A1* | 2/2017 | Kazmi | H04B 17/309 |
| 2018/0007724 A1* | 1/2018 | Kazmi | H04W 8/005 |
| 2018/0062824 A1* | 3/2018 | Noh | H04B 17/18 |

FOREIGN PATENT DOCUMENTS

| | | |
|---|---|---|
| EP | 3291477 A1 | 3/2018 |
| EP | 3457617 A1 | 3/2019 |
| WO | WO2015096027 A1 | 7/2015 |

OTHER PUBLICATIONS

First Office Action for corresponding Chinese Application No. 201910272185.4; dated Oct. 30, 2020 (29 pages), Machine Translation.

* cited by examiner

| O-SIGNATURE |
| --- |
| - PSD masks (upstream and downstream) |
| - DS PSD descriptor (CDPSDds) |
| - UPBO parameters |
| - Initial US time gap ($T_{g1}'$) |
| - US and DS probe sequences |
| - Time markers for US and DS probe sequences |

| O-TG-UPDATE |
| --- |
| - US time gap $T_{g1}$ correction |

| R-MSG 1 |
| --- |
| - estimate of electrical length |
| - US PSD descriptor (STARTPSDus) |

| O-UPDATE |
| --- |
| - final electrical length |
| - US PSD ceiling (for FUS) |
| - final upstream time gap $T_{g1}'$ correction |
| - operation mode selection (TDD or FDX) |
| - US PSD mask for FDS (if FDX mode) |

| R-UPDATE |
| --- |
| - DS PSD ceiling |
| - updated US PSD descriptor (CDPSDus) |

| O-VECTOR-FEEDBACK |
| --- |
| - request for vectoring feedback report |
| - SOC tone repetition rate update |

| R-ACK |
| --- |
| R-VECTOR-FEEDBACK |
| - Vectoring feedback reports |

| O-SNR |
| --- |
| - downstream SNR request |

| R-SNR |
| --- |
| - downstream SNR report |
| - DS blackout sub-carriers |

| O-PRM |
| --- |
| - DS reference PSD |
| - Proposed MEDLEYus set |
| - MEDLEYds set |
| - US blackout sub-carriers |
| - US reference PSD (MREFPSDMASKus) |

| R-PRM |
| --- |
| - Number of pilot symbols |
| - MEDLEYus set |
| - US reference PSD (MREFPSDus) |

Fig. 5

METHOD AND APPARATUS FOR CONFIGURING OPERATION MODE OF A REMOTE TRANSCEIVER UNIT

FIELD OF THE INVENTION

Various example embodiments relate to a method configuring an operation mode of a remote transceiver unit, an access node and a remote transceiver unit.

BACKGROUND

In a communication system operating according to G.fast standard, the transmission is carried out by means of Time Division Duplexing (TDD). TDD transmission requires a cyclic extension (CE) in each symbol to compensate for effects due to the delay spread. The propagation delay only needs to be addressed between the upstream subframe and the downstream subframe and does not need to be considered in the CE.

G.mgfast standard will define full-duplex (FDX) as a means for communication. FDX transmission can theoretically double the aggregate data rate compared to TDD. But FDX requires a CE in each symbol to compensate for effects due to both the propagation delay and the delay spread of the signal. If the loop length is too long, or the signal gets too distorted, the inter-symbol-interference (ISI) will start to degrade performance.

European patent application 17191707.3 has disclosed a scheme for enabling a coexistence of FDX and TDD in a communication system.

According to the current standards, an operation mode of a remote transceiver unit is normally set during the handshake procedure. This operation mode is selected based on transceiver capabilities and upfront configuration by an operator's management system.

SUMMARY OF THE INVENTION

According to the state of the art, at the time of setting operation mode of the remote transceiver unit, the system has no knowledge on the channel condition, and cannot determine a proper operation mode for the remote transceiver unit.

Thus, an objective of the invention is to improve the configuration of the operation mode for a remote transceiver unit.

The object of the invention is achieved by the method and apparatus according to the claims.

According to one aspect of the present invention, there is provided a method for configuring an operation mode of a remote transceiver unit connected to an access node via a communication line, the remote transceiver unit being operable in at least two operation modes: a Time Division Duplex, TDD, mode and a full duplex, FDX, mode; the method comprising, by the access node: a) obtaining a channel characteristic derived from channel measurements performed over the communication line, b) determining the operation mode of the remote transceiver unit as the FDX mode or the TDD mode based on the channel characteristic; c) transmitting an indication indicating the determined operation mode to the remote transceiver unit.

In one embodiment, the channel characteristic comprises at least one of a propagation delay, a delay spread and an electrical length of the communication line.

In one embodiment, the method is performed during a channel discovery phase of an initialization procedure performed over the communication line.

In one embodiment, the channel discovery phase is preceded by a handshake phase, during which the access node and the remote transceiver unit agree to a preliminary mode of operation, and then, the preliminary mode of operation is superseded by the operation mode determined in step b).

In one embodiment, the agreed preliminary mode of operation is the FDX mode.

In one embodiment, the remote transceiver unit operates intermediately in the TDD mode prior to step a).

In one embodiment, when the remote transceiver unit is operated in the FDX mode, symbols transmitted over the communication line have a first structure which comprises a first cyclic prefix portion (CP1), a data portion and a first cyclic suffix portion (CS1), wherein a cyclic extension (CE1) comprising the first cyclic prefix portion (CP1) and the first cyclic suffix portion (CS1) has a predetermined length ($L_{CE}$); and wherein when the remote transceiver unit is operated in the TDD mode, symbols transmitted over the communication line have a second structure which comprises a second cyclic prefix portion (CP2) and a data portion, the second cyclic prefix portion (CP2) having the predetermined length ($L_{CE}$), and the symbol with the first structure and the symbol with the second structure having same symbol length $L_{symb}$.

In one embodiment, the method further comprises: b1) determining the operation mode of the remote transceiver unit as the TDD mode, if the channel characteristic has a value above a predetermined threshold; b2) determining the operation mode of the remote transceiver unit as the FDX mode, if the channel characteristic has a value not above the predetermined threshold.

In one embodiment, the channel characteristic comprises a propagation delay, and the predetermined threshold is set in such a way that when the remote transceiver unit is operated in the FDX mode, the length of the first cyclic suffix portion (CS1) is long enough to accommodate the propagation delay.

In one embodiment, the channel characteristic comprises a delay spread, and the predetermined threshold is set in such a way that when the remote transceiver unit s operated in the FDX mode, the length of the first cyclic prefix portion (CP1) is long enough to accommodate the delay spread.

In one embodiment, the channel characteristic comprises a propagation delay and a delay spread, and the predetermined threshold is set in such a way that when the remote transceiver unit is operated in the FDX mode, the length of the cyclic extension (CE1) is long enough to accommodate combined effects of the delay spread and the propagation delay.

In one embodiment, the channel characteristic comprises a loop length, and the predetermined threshold is pre-set based on prior knowledge or experience on how the loop length of the communication line translates to a length of the cyclic extension (CE1) required for the communication line. One way to obtain the loop length from channel measurements is to measure propagation delay. For a given cable type, there is a one-to-one mapping between propagation delay and loop length, and both may be used interchangeably. In practice, the threshold may be set in time units, reflecting propagation delay, rather than in distance, reflecting the actual loop length. In other words, the propagation delay itself becomes the channel characteristic that represents loop length.

In one embodiment, the channel measurements are performed by the access node.

In one embodiment, the channel measurements are performed by the remote transceiver unit, the method further comprising, by the remote transceiver unit: —deriving the channel characteristic from the channel measurements; and —transmitting the channel characteristic to the access node.

According to another aspect of the present invention, there is provided an access node, for connection to a remote transceiver unit via a communication line, the remote transceiver unit being operable in at least two operation modes: a Time Division Duplex, TDD, mode and a full duplex, FDX, mode; the access node comprising at least one processor and at least one memory including computer program code, the at least one memory and the computer program code being configured, with the at least one processor, to cause the access node to: a) obtain a channel characteristic derived from channel measurements performed over the communication line, b) determine the operation mode of the remote transceiver unit as the FDX mode or the TDD mode based on the channel characteristic; c) transmit an indication indicating the determined operation mode to the remote transceiver unit.

According to another aspect of the present invention, there is provided a digital transceiver unit, for connection to a remote transceiver unit via a communication line, the remote transceiver unit being operable in at least two operation modes: a Time Division Duplex, TDD, mode and a full duplex, FDX, mode; the digital transceiver unit comprising at least one processor and at least one memory including computer program code, the at least one memory and the computer program code being configured, with the at least one processor, to cause the digital transceiver unit to: a) obtain a channel characteristic derived from channel measurements performed over the communication line, b) determine the operation mode of the remote transceiver unit as the FDX mode or the TDD mode based on the channel characteristic; c) transmit an indication indicating the determined operation mode to the remote transceiver unit.

According to another aspect of the present invention, there is provided a remote transceiver unit for connection to an access node via a communication line, and being operable in at least two operation modes: a Time Division Duplex, TDD, mode and a full duplex, FDX, mode, characterized in that the operation mode of the remote transceiver unit is configured according to the present invention.

The aforementioned embodiments of the method correspond with similar embodiments of the access node, similar embodiments of the digital transceiver unit, and similar embodiments of the remote transceiver unit.

According to the present invention, operation mode of the remote transceiver unit can be determined more appropriately after the access node has knowledge of the channel condition.

BRIEF DESCRIPTION OF HE FIGURES

Same or similar reference numerals refer to same or similar parts or components.

DETAILED DESCRIPTION

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. The sequence of method steps are not limited to the specific embodiments, the method steps may be performed in other possible sequence. Similarly, specific structural and functional details disclosed herein are merely representative for purposes of describing the embodiments. The invention described herein, however, may be embodied in many alternate forms and should not be construed as limited to only the embodiments set forth herein.

Figure 1:
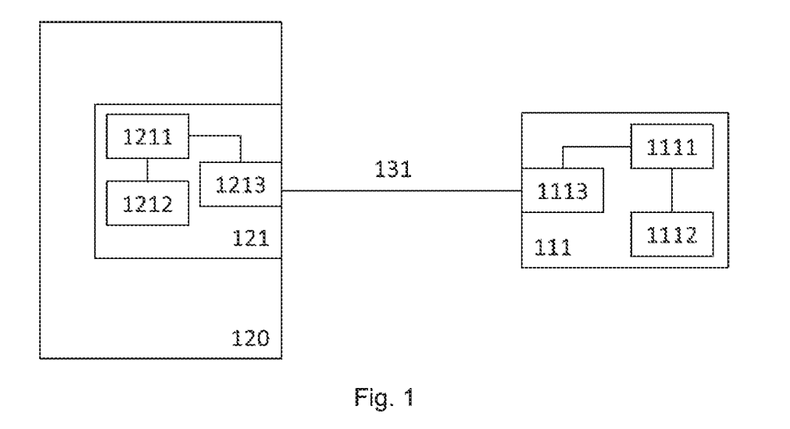
FIG. 1 depicts an illustrative structural diagram of a communication system according to an embodiment of the present invention.

FIG. 1 shows a schematic topology of a communication system according to an embodiment of the present invention.

As shown in FIG. 1, the communication system comprises a remote transceiver unit 111 and an access node 120.

Specifically, the remote transceiver unit 111 comprises a processor 1111 communicatively connected to a memory 1112 and an analog front end 1113. The access node 120 comprises a central transceiver unit 121. The remote transceiver unit 111 is connected to the central transceiver unit 121 in the access node 120 via a communication line 131. Typically, the communication line 131 is an Unshielded Twisted copper Pair (UTP).

Similarly, the central transceiver unit 121 also comprises a processor 1211 communicatively connected to a memory 1212 and an analog front end 1213. The remote transceiver unit 111 and the central transceiver unit 121 are operable in at least two operation modes: a Time Division Duplex (TDD) mode and a full duplex (FDX) mode.

The processor 1211 and the memory 1212 (similarly the processor 1111 and the memory 1112) are configured for digitally processing the transmit and receive communication signals, and are further configured to set up and operate downstream and upstream communication channels for conveying user and control traffic over the communication line 131. The analog front ends 1113 and 1213 respectively comprise an appropriate analog circuitry (not shown) for connecting to the communication line 131. Specifically, the analog circuitry may comprise: a Digital-to-Analog Converter (DAC) and an Analog-to-Digital Converter (ADC), possibly an analog transmit filter and an analog receive filter for confining the signal energy within the appropriate communication frequency bands while rejecting out-of-band interference, a line driver for amplifying the transmit signal and for driving the communication line, and a Low Noise Amplifier (LNA) for amplifying the receive signal with as little noise as possible. In case of FDX operation, the analog front ends 1113 and 1213 respectively further comprise a hybrid for coupling the transmitter output to the transmission medium and the transmission medium to the receiver input while achieving low transmitter-receiver coupling ratio. In case of TDD operation, the hybrid can be advantageously omitted or bypassed, as the transmitter and receiver operate in alternate mode: the receive circuitry is switched OFF (or the receive signal is discarded) while the transmit circuitry is active, and the way around, the transmit circuitry is switched OFF while the receive circuitry is active. The analog ends 1113 and 1213 may further comprise an impedance-matching circuitry for adapting to the characteristic impedance of the transmission medium, and/or a clipping circuitry for clipping any voltage or current surge occurring over the transmission medium, and/or an isolation circuitry (typically a transformer) for DC-isolating the transceiver from the transmission medium.

Specifically, the access node 120 may be implemented as a Distribution Point Unit (DPU) or a digital Subscriber Line Access Multiplexer (DSLAM). The remote transceiver unit 111 may form part of a Customer Premises Equipment (CPE), such as gateway, a modem, a bridge, a router, a network Interface card (NIC) and the likes.

The access node 120 may further comprise other central transceiver units connected to other remote transceiver units via respective other communication lines (not shown). The other central transceiver units may be similar to the central transceiver unit 121 and are operable in the FDX mode or the TDD mode. The other remote transceiver units may be similar to the remote transceiver unit 111 and are operable in the FDX mode or the TDD mode.

Figure 2A:
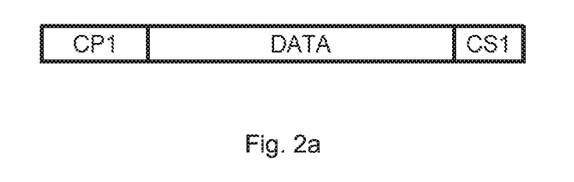
FIGS. 2a and 2b show respectively a schematic diagram of the structure of Discrete Multi Tone (DMT) symbols transmitted over a communication line.
Figure 2B:
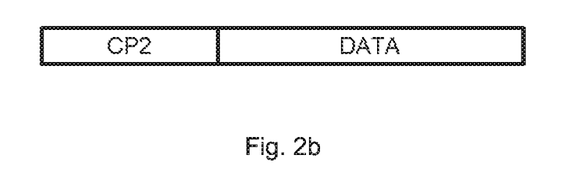

FIGS. 2*a* and 2*b* show respectively a schematic diagram of the structure of Discrete Multi Tone (DMT) symbols transmitted over the communication line 131.

FIG. 2*a* shows a schematic diagram of a first structure. When the central transceiver unit 121 and the remote transceiver unit 111 are operated in the FDX mode, symbols transmitted over the communication line 131 have the first structure as shown in FIG. 2*a*. The first structure comprises a first cyclic prefix portion CP1, a data portion DATA and a first cyclic suffix portion CS1. A cyclic extension CE1 comprising the first cyclic prefix portion CP1 and the first cyclic suffix portion CS1 has a predetermined length $L_{CE}$.

It must be understood that such structure comprising CP1 and CS1 is implicitly there, even if the transmitter only explicitly prepends a CS1. Indeed, and explained by example of a full duplex multicarrier system, the receiver will still be required to discard a number of samples equivalent to a cyclic suffix from the received time samples of each symbol to obtain orthogonality with the echo received from the transmit symbols.

FIG. 2*b* shows a schematic diagram of a second structure. When the remote transceiver unit 111 is operated in the TDD mode, symbols transmitted over the communication line 131 have the second structure as shown in FIG. 2*b*. The second structure comprises a second cyclic prefix portion CP2 and a data portion DATA. The second cyclic prefix portion CP2 has the predetermined length $L_{CE}$, same as the length of the cyclic extension CE1 in the first structure. Besides, the symbol with the first structure and the symbol with the second structure have same symbol length $L_{symb}$.

As opposed to a FDX line, a TDD line does not have an implicit CS since the receiver may utilize the last few samples of the received symbols to maximize the supported delay spread. As is often the case, windowing may be applied to the transmit or receive symbols for the purpose of spectral containment. During the windowing process a small cyclic suffix may be added proportional to the window length. Since this is often accompanied with an overlap-add of subsequent symbols, the suffix due to windowing does not lead to a prolongation of the actual symbol duration, and therefore is ignored in further discussion as well as in FIG. 2*b*.

By configuring the symbol structure as described above, it is possible to have different communication lines in the same binder operating in different modes. Coexistence between the TDD mode and the FDX mode is enabled.

In an example, the access node 120 comprises another central transceiver unit 122 (not shown) connected to another remote transceiver unit 112 (not shown) operating in the TDD mode via another communication line 132 (not shown). When the operation mode of the central transceiver unit 121 and the remote transceiver unit 111 is determined as the FDX mode, transmission of a symbol on the communication line 131 is aligned with reception of a symbol on the other communication line 132 in upstream direction or transmission of a symbol on the other communication line 132 in downstream direction.

In another example, the access node 120 comprises yet another central transceiver unit 123 (not shown) connected to yet another remote transceiver unit 113 (not shown) operating in the FDX mode via yet another communication line 133 (not shown). When the operation mode of the central transceiver unit 121 and the remote transceiver unit 111 is determined as the TDD mode, transmission of a symbol on the yet other communication line 133 is aligned with reception of a symbol on the communication line 131 in upstream direction or transmission of a symbol on the communication line 131 in downstream direction.

Figure 3:
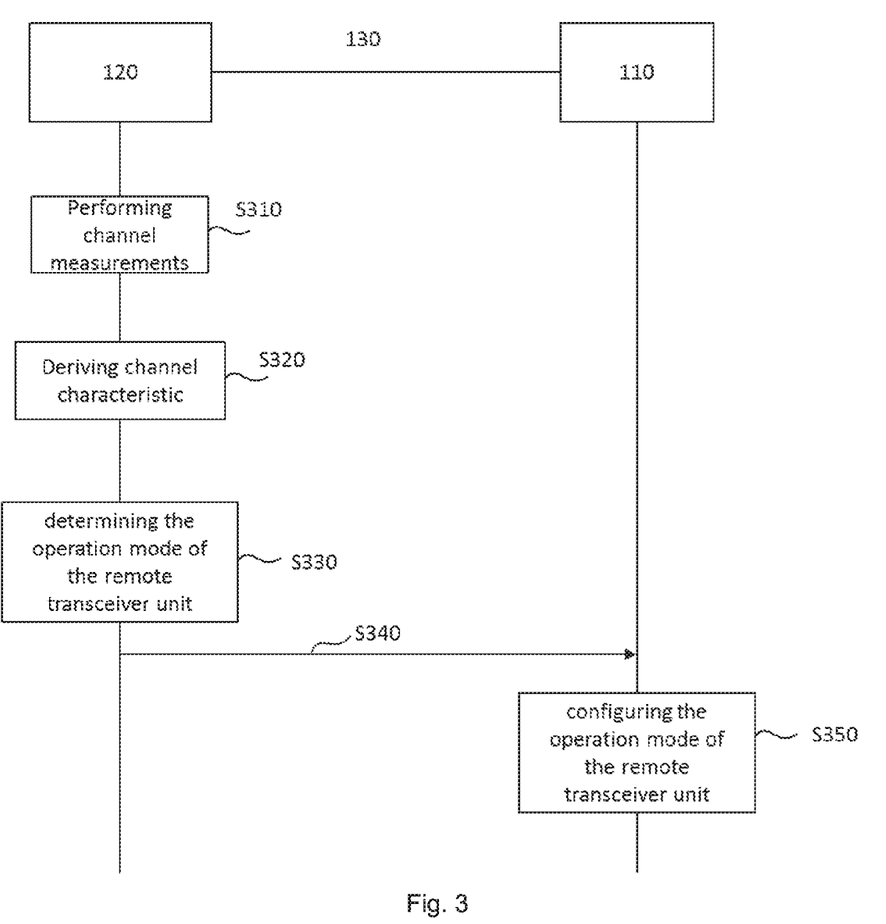
FIG. 3 depicts a schematic flow diagram of the method according to an embodiment of the present invention.

FIG. 3 shows a schematic flow diagram of the method according to an embodiment of the present invention. The method according to the present invention may be implemented by the respective processors 1211 and 1111 cooperatively carrying out the computer program code stored in the memory 1212 and 1112 of the respective transceiver units 121 and 111.

In FIG. 3, the central transceiver unit 121 in the access node 120 performs channel measurements over the communication line 131 in step S310. Specifically, prior to step S310, the remote transceiver unit 111 may transmit probe symbols to the central transceiver unit 121 in the access node 120, for example during sync symbol position (e.g. R-P-VECTOR1). The central transceiver unit 121 may determine the transfer function on carrier k of the channel as:

$$H(k)=Y(s,k)X(s,k)^{-1}$$

based on the knowledge of the transmitted probe symbols X(s,k) and the received symbols Y(s,k) during time instance s and on carrier k. Other more advanced estimators can be considered that may take into account statistics of the noise received on carrier k, as well as some further averaging.

Alternatively, the central transceiver unit 121 may measure the time lapsed between a downstream transmission reference point and an upstream reception reference point. In the example of a TDD operation like in G.fast, the central transceiver unit 121 has instructed the remote transceiver unit 111 to apply a time gap Tg1' between the end of downstream reception and the start of upstream transmission. The access node 111 then measures the time lapsed Tg2 between the end of downstream transmission and the start of upstream reception.

In step S320, the central transceiver unit 121 derives channel characteristic from the channel measurements. In one embodiment, the channel characteristic comprises at least one of a propagation delay, a delay spread and an electrical length of the communication line. Specifically, the propagation delay and the delay spread may be derived by performing Inverse Discrete Fourier transform (IDFT) on the transfer function of the channel H(k).

Alternatively, the central transceiver unit 121 may determine the propagation delay from the measured time lapsed between a downstream transmission reference point and an upstream reception reference point. In the example of a TDD operation like in G.fast, the central transceiver unit 121 obtains the propagation delay from the measured time lapsed between the end of downstream transmission and the start of upstream reception Tg2. Assuming the propagation delay in upstream and downstream directions are equal, the propagation delay Tpd is estimated by Tpd=(Tg2−Tg1')/2. During channel discovery phase, the remote transceiver 111 may not be allowed to exploit every upstream data symbol, but only during so-called SYNC symbol positions that carry the probe sequence. Such SYNC symbols may not be the first upstream symbol position of the upstream subframe. In that case, Tg2 is derived from the measured time lapsed reduced by the number of idle upstream symbols prior to the SYNC symbol.

After the central transceiver unit 121 in the access node 120 obtains the channel characteristic derived from channel measurements performed over the communication line 131 in step S320, the central transceiver unit 121 in the access node 120 determines in step S330 the operation mode of the central transceiver unit 121 and the remote transceiver unit 111 as the FDX mode or the TDD mode based on the channel characteristic. In another embodiment, the operation mode of the central transceiver unit 121 and the remote transceiver unit 111 may be determined outside the central transceiver unit 121, e.g. by an external communication controller forming part of the access node 120 (or of another network element, such as a network analyzer), in which case the one or more channel characteristics or the channel measurements shall be forwarded to the external communication controller for appropriate mode selection, and the selected mode of operation shall be returned to the central transceiver unit 121 and (via the communication line 131) to the remote transceiver unit 111.

In one embodiment, the access node 120 determines the operation mode of the central transceiver unit 121 and the remote transceiver unit 111 as the TDD mode, if the channel characteristic has a value above a predetermined threshold. The access node 120 determines the operation mode of the central transceiver unit 121 and the remote transceiver unit 111 as the FDX mode, if the channel characteristic has a value not above the predetermined threshold.

In one embodiment, the channel characteristic comprises a propagation delay, and the predetermined threshold is set in such a way that when the central transceiver unit 121 and the remote transceiver unit 111 are operated in the FDX mode, the length of the first cyclic suffix portion CS1 is long enough to accommodate the propagation delay.

In another embodiment, the channel characteristic additionally or alternatively comprises a delay spread, and the predetermined threshold is set in such a way that when the central transceiver unit 121 and the remote transceiver unit 111 are operated in the FDX mode, the length of the first cyclic prefix portion CP1 is long enough to accommodate the measured delay spread.

In yet another embodiment, the channel characteristic comprises a propagation delay and a delay spread, and the predetermined threshold is set in such a way that when the central transceiver unit 121 and the remote transceiver unit 111 are operated in the FDX mode, the length of the cyclic extension CE1 is long enough to accommodate the combined effects of the delay spread and propagation delay, regardless of how CE1 is partitioned in a CP1 and CS1.

In yet another embodiment, the channel characteristic comprises a loop length, and the predetermined threshold is pre-set by an operator's management system in such a way that when the central transceiver unit 121 and the remote transceiver unit 111 are operated in the FDX mode, the measured loop length is below the pre-set threshold. In this case, the operator's management system may set the threshold based on prior knowledge or experience on how loop length translates to required CE1 length for the loop type of the communication line 131. The threshold may be predetermined and static, or may be autonomously updated by the operator's management system based on acquired local or system-wide knowledge.

Specifically, when the remote transceiver unit 111 is operated in the FDX mode, the cyclic extension portion has fixed length. If the loop length is too long, or the signal distortion is too large, the cyclic extension portion will be not enough to accommodate both the delay spread and the propagation delay, and the inter-symbol-interference will start to degrade performance. Thus, if the channel characteristic has a value above a predetermined threshold, it suggests that the loop between the central transceiver unit 121 and the remote transceiver unit 111 is not appropriate to operate the central transceiver unit 121 and the remote transceiver unit 111 in the FDX mode. Therefore, the access node 120 determines the operation mode of the central transceiver unit 121 and the remote transceiver unit 111 as the TDD mode in that case. If the channel characteristic has a value not above the predetermined threshold, it suggests that the cyclic extension portion will be enough to accommodate both the delay spread and the propagation delay. Thus it is appropriate to operate the central transceiver unit 121 and the remote transceiver unit 111 in FDX mode and the access node 120 may determine the operation mode of the central transceiver unit 121 and the remote transceiver unit 111 as the FDX mode in that case.

In step S340, the central transceiver unit 121 in the access node 120 transmits an indication indicating the determined operation mode to the remote transceiver unit 111. Then in step S350, the remote transceiver unit 111 configures its operation mode as indicated in the indication.

Figure 4:
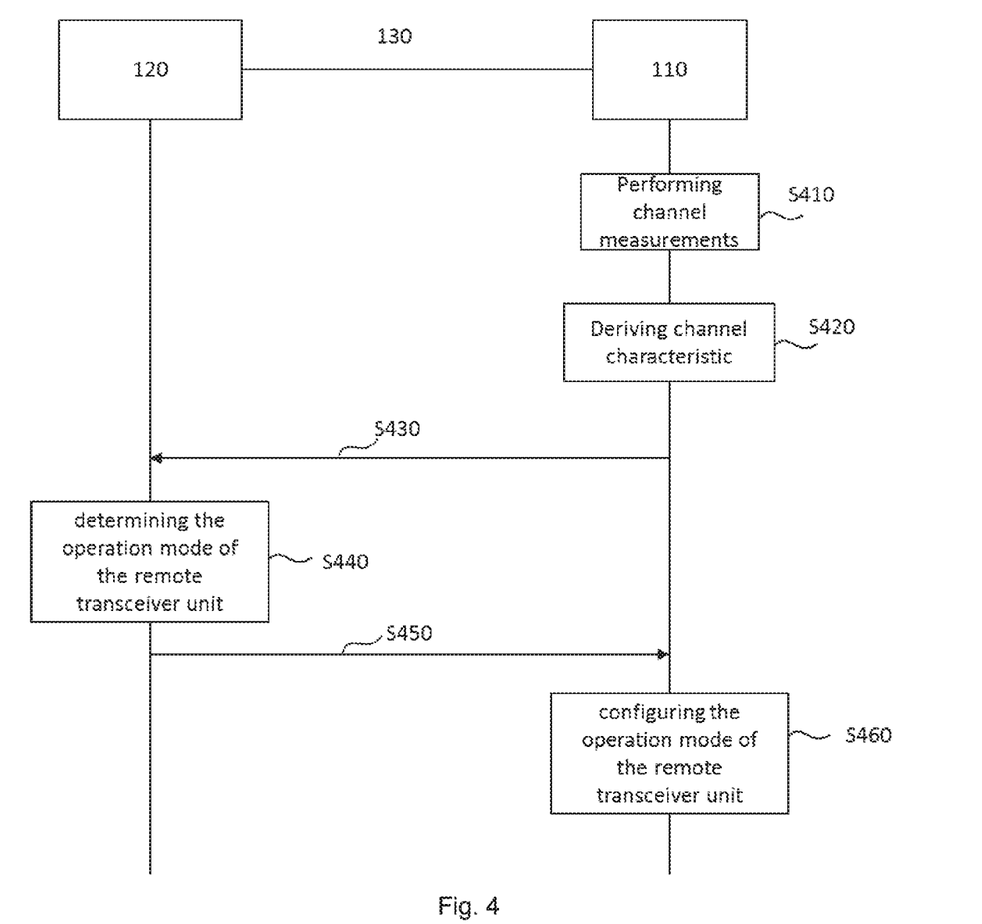
FIG. 4 depicts a schematic flow diagram of the method according to another embodiment of the present invention.

FIG. 4 shows a schematic flow diagram of the method according to another embodiment of the present invention.

In FIG. 4, the remote transceiver unit 111 performs channel measurements over the communication line 131 in step S410. The channel measurements may be performed similarly as described with respect to step S310, and the details will not be repeated here.

In step S420, the remote transceiver unit 111 derives channel characteristic from the channel measurements. Similarly, the channel characteristic comprises at least one of a propagation delay, a delay spread and an electrical length of the communication line.

In step S430, the remote transceiver unit 111 transmits the channel characteristic to the central transceiver unit 121 in the access node 120.

After the access node 120 obtains the channel characteristic derived from channel measurements performed over the communication line 131 in step S430, the method proceeds with steps S440, S450 and S460. These steps are similar to the steps S330, S340 and S350 described above. Thus it will not be repeated here.

In one embodiment, the method described above with respect to FIGS. 4 and 5 is performed during a channel discovery phase of an initialization procedure performed over the communication line 131.

Figure 5:
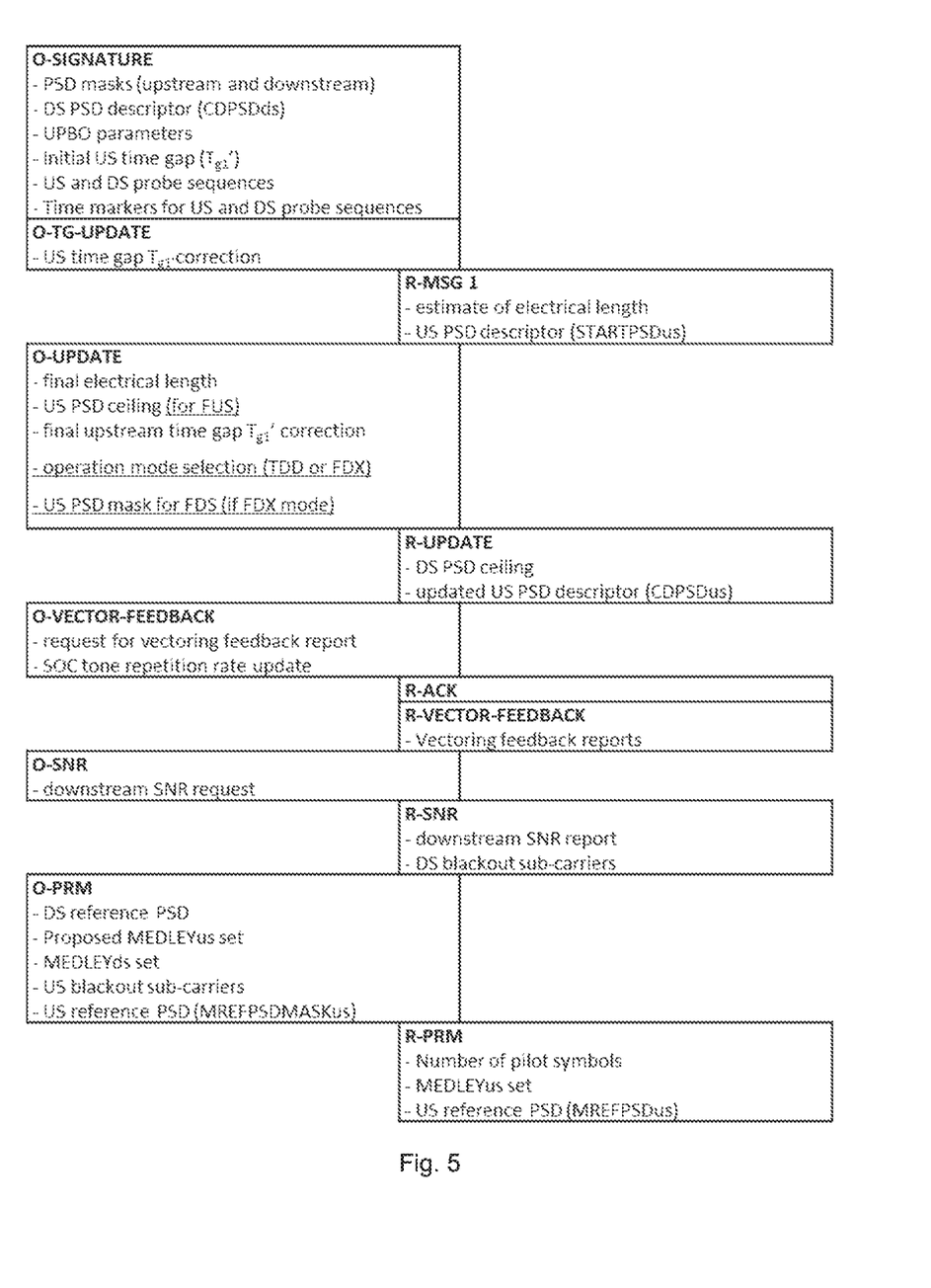
FIG. 5 depicts a schematic example of Special Operations Channel (SOC) messages transmitted during channel discovery phase.

FIG. 5 shows a schematic example of special operations channel (SOC) messages transmitted during channel discovery phase.

Most of the messages illustrated in FIG. 5 are same as those defined in G.fast standard.

Differences between the SOC messages illustrated in FIG. 5 and those defined in G.fast standard are underlined.

As shown in FIG. 5, the operation mode determined in step S340 or S430 is communicated to the remote transceiver unit 111 during O-UPDATE phase.

Specifically, after O-TG-UPDATE, the remote transceiver unit starts transmitting also during data symbols in full duplex upstream subframe, a phase called 'R-P-CHANNEL DISCOVERY', allowing the access node to obtain channel info for a better estimation of the propagation delay. At this point, sufficient info is available to determine whether the loop would perform better in the TDD mode or the FDX mode. Therefore, the access node informs the remote transceiver unit of the determined operation mode during O-UPDATE.

A mode selection is already feasible as early as O-TG-UPDATE. However, a better estimate can be obtained by measuring channel characteristics during R-P-CHANNEL DISCOVERY, and it is not critical to have selected the mode prior to O-UPDATE. Therefore, mode selection during O-UPDATE is preferred.

Additionally, if the operation mode determined for the remote transceiver unit 111 is the FDX mode, the central transceiver unit 121 in the access node 120 further transmits upstream power spectral density (PSD) mask for full duplex Downstream Subframe (FDS) along with the determined operation mode to the remote transceiver unit 111.

In one embodiment, the channel discovery phase is preceded by a handshake phase, during which the central transceiver unit 121 and the remote transceiver unit 111 agree to a preliminary mode of operation, and then, the preliminary mode of operation is superseded by the operation mode determined in step S330 or S440. In one embodiment, the agreed preliminary mode of operation is the FDX mode.

In one embodiment, the operation mode of the central transceiver unit 121 and the remote transceiver unit 111 is set to the FOX mode during handshake procedure. Then during channel discovery phase, the remote transceiver unit 111 operates intermediately in the TDD mode prior to step S310 or S410. In this way, although FDX was selected during handshake, no risk is taken to harm other active lines by inter-symbol interference due to crosstalk from transmitted upstream signals during downstream transmission periods. Indeed, due to the lack of measurements of the channel characteristics, it is not yet known whether FOX operation by the remote transceiver 111 may or may not be harmful to other lines in terms of inter-symbol interference.

The invention claimed is:

1. A method for configuring an operation mode of a remote transceiver connected to an access node via a communication line, the remote transceiver being operable in at least two operation modes: a Time Division Duplex (TDD) mode and a full duplex (FDX) mode, the method comprising, by the access node:
  a) obtaining a channel characteristic derived from channel measurements performed over the communication line;
  b) determining the operation mode of the remote transceiver as the FDX mode or the TDD mode based on the channel characteristic; and
  c) transmitting an indication indicating the determined operation mode to the remote transceiver, wherein:
  when the remote transceiver is operated in the FDX mode, symbols transmitted over the communication line have a first structure which comprises a first cyclic extension and a data portion; and
  when the remote transceiver is operated in the TDD mode, symbols transmitted over the communication line have a second structure which comprises a second cyclic extension and a data portion, wherein:
    (i) the first cyclic extension and the second cyclic extension have the same cyclic extension length;
    (ii) the symbols with the first structure and the symbols with the second structure have the same symbol length;
    (iii) the remote transceiver is operated in the FDX mode if the length of the first cyclic extension is long enough to accommodate both a delay spread and a propagation delay of the communication line; and
    (iv) the remote transceiver is operated in the TDD mode if the length of the second cyclic extension is not long enough to accommodate both the delay spread and the propagation delay of the communication line.

2. The method according to claim 1, wherein the channel characteristic comprises at least one of the propagation delay of the communication line, the delay spread of the communication line, an electrical length of the communication line, and a loop length of the communication line.

3. The method according to claim 1, wherein the method is performed during a channel discovery phase of an initialization procedure performed over the communication line.

4. The method according to claim 3, wherein the channel discovery phase is preceded by a handshake phase, during which the access node and the remote transceiver agree to a preliminary mode of operation, and then, the preliminary mode of operation is superseded by the operation mode determined in step b).

5. The method according to claim 4, wherein the agreed preliminary mode of operation is the FDX mode.

6. The method according to claim 5, wherein the remote transceiver operates in the TDD mode prior to step a).

7. The method according to claim 1, wherein step b) comprises:
  b1) determining the operation mode of the remote transceiver as the TDD mode, if the channel characteristic has a value above a predetermined threshold;
  b2) determining the operation mode of the remote transceiver as the FDX mode, if the channel characteristic has a value not above the predetermined threshold.

8. The method according to claim 7, wherein the channel characteristic comprises a propagation delay, and the predetermined threshold is set in such a way that, when the remote transceiver is operated in the FDX mode, the length of the first cyclic extension is long enough to accommodate the propagation delay.

9. The method according to claim 7, wherein the channel characteristic comprises a delay spread, and the predetermined threshold is set in such a way that, when the remote transceiver is operated in the FDX mode, the length of the first cyclic extension is long enough to accommodate the delay spread.

10. The method according to claim 7, wherein the channel characteristic comprises a propagation delay and a delay spread, and the predetermined threshold is set in such a way that, when the remote transceiver is operated in the FDX mode, the length of the first cyclic extension is long enough to accommodate combined effects of the delay spread and the propagation delay.

11. The method according to claim 7, wherein the channel characteristic comprises a loop length, and the predetermined threshold is pre-set based on prior knowledge or experience on how the loop length of the communication line translates to a length of the first cyclic extension required for the communication line.

12. The method according to claim 1, wherein the channel measurements are performed by the access node.

13. The method according to claim 1, wherein the channel measurements are performed by the remote transceiver, the method further comprising, by the remote transceiver:
   deriving the channel characteristic from the channel measurements; and
   transmitting the channel characteristic to the access node.

14. A remote transceiver for connection to an access node via a communication line, and operable in at least two operation modes: a Time Division Duplex (TDD) mode and a full duplex (FDX) mode, characterized in that the operation mode of the remote transceiver is configured according to the method of claim 1.

15. An access node for connection to a remote transceiver via a communication line, the remote transceiver being operable in at least two operation modes: a Time Division Duplex (TDD) mode and a full duplex (FDX) mode;
   the access node comprising at least one processor and at least one memory including computer program code, the at least one memory and the computer program code being configured, with the at least one processor, to cause the access node to:
   a) obtain a channel characteristic derived from channel measurements performed over the communication line;
   b) determine the operation mode of the remote transceiver as the FDX mode or the TDD mode based on the channel characteristic; and
   c) transmit an indication indicating the determined operation mode to the remote transceiver, wherein:
   when the remote transceiver is operated in the FDX mode, symbols transmitted over the communication line have a first structure which comprises a first cyclic extension and a data portion; and
   when the remote transceiver is operated in the TDD mode, symbols transmitted over the communication line have a second structure which comprises a second cyclic extension and a data portion, wherein:
      (i) the first cyclic extension and the second cyclic extension have the same cyclic extension length;
      (ii) the symbols with the first structure and the symbols with the second structure have the same symbol length;
      (iii) the remote transceiver is operated in the FDX mode if the length of the first cyclic extension is long enough to accommodate both a delay spread and a propagation delay of the communication line; and
      (iv) the remote transceiver is operated in the TDD mode if the length of the second cyclic extension is not long enough to accommodate both the delay spread and the propagation delay of the communication line.

16. The access node according to claim 15, wherein the channel characteristic comprises at least one of the propagation delay of the communication line, the delay spread of the communication line, an electrical length of the communication line, and a loop length of the communication line.

17. The access node according to claim 13, wherein the access node obtains the channel characteristic, determines the operation mode, and transmits the indication during a channel discovery phase of an initialization procedure performed over the communication line.

18. The access node according to claim 17, wherein the channel discovery phase is preceded by a handshake phase, during which the access node and the remote transceiver agree to a preliminary mode of operation, and then, the preliminary mode of operation is superseded by the determined operation mode.

19. A method for configuring an operation mode of a remote transceiver connected to an access node via a communication line, the remote transceiver being operable in at least two operation modes: a Time Division Duplex (TDD) mode and a full duplex (FDX) mode, the method comprising, by the access node:
   a) obtaining a channel characteristic derived from channel measurements performed over the communication line;
   b) determining the operation mode of the remote transceiver as the FDX mode or the TDD mode based on the channel characteristic; and
   c) transmitting an indication indicating the determined operation mode to the remote transceiver, wherein:
   when the remote transceiver is operated in the FDX mode, symbols transmitted over the communication line have a first structure which comprises a first cyclic extension and a data portion, wherein the first cyclic extension has a predetermined cyclic extension length;
   when the remote transceiver is operated in the TDD mode, symbols transmitted over the communication line have a second structure which comprises a second cyclic extension and a data portion, wherein (i) the second cyclic extension has the predetermined cyclic extension length and (ii) the symbols with the first structure and the symbols with the second structure have the same symbol length; and
   step b) comprises:
      b1) determining the operation mode of the remote transceiver as the TDD mode, if the channel characteristic has a value above a predetermined threshold;
      b2) determining the operation mode of the remote transceiver as the FDX mode, if the channel characteristic has a value not above the predetermined threshold.

20. The method according to claim 19, wherein the channel characteristic comprises a propagation delay, and the predetermined threshold is set in such a way that, when the remote transceiver is operated in the FDX mode, the length of the first cyclic extension is long enough to accommodate the propagation delay.

21. The method according to claim 19, wherein the channel characteristic comprises a delay spread, and the predetermined threshold is set in such a way that, when the remote transceiver is operated in the FDX mode, the length of the first cyclic extension is long enough to accommodate the delay spread.

22. The method according to claim 19, wherein the channel characteristic comprises a propagation delay and a delay spread, and the predetermined threshold is set in such a way that, when the remote transceiver is operated in the FDX mode, the length of the first cyclic extension is long enough to accommodate combined effects of the delay spread and the propagation delay.

23. The method according to claim 19, wherein the channel characteristic comprises a loop length, and the predetermined threshold is pre-set based on prior knowledge or experience on how the loop length of the communication line translates to a length of the first cyclic extension required for the communication line.

24. A remote transceiver for connection to an access node via a communication line, and operable in at least two operation modes: a Time Division Duplex (TDD) mode and a full duplex (FDX) mode, characterized in that the operation mode of the remote transceiver is configured according to the method of claim 19.

25. An access node for connection to a remote transceiver via a communication line, the remote transceiver being operable in at least two operation modes: a Time Division Duplex (TDD) mode and a full duplex (FDX) mode;
  the access node comprising at least one processor and at least one memory including computer program code, the at least one memory and the computer program code being configured, with the at least one processor, to cause the access node to:
  a) obtain a channel characteristic derived from channel measurements performed over the communication line;
  b) determine the operation mode of the remote transceiver as the FDX mode, if the channel characteristic has a value not above a predetermined threshold, or the TDD mode, if the channel characteristic has a value above the predetermined threshold; and
  c) transmit an indication indicating the determined operation mode to the remote transceiver, wherein:
  when the remote transceiver is operated in the FDX mode, symbols transmitted over the communication line have a first structure which comprises a first cyclic extension and a data portion, wherein the first cyclic extension has a predetermined cyclic extension length; and
  when the remote transceiver is operated in the TDD mode, symbols transmitted over the communication line have a second structure which comprises a second cyclic extension and a data portion, wherein (i) the second cyclic extension has the predetermined cyclic extension length and (ii) the symbols with the first structure and the symbols with the second structure have the same symbol length.

26. The access node according to claim 25, wherein the channel characteristic comprises a propagation delay, and the predetermined threshold is set in such a way that, when the remote transceiver is operated in the FDX mode, the length of the first cyclic extension is long enough to accommodate the propagation delay.

27. The access node according to claim 25, wherein the channel characteristic comprises a delay spread, and the predetermined threshold is set in such a way that, when the remote transceiver is operated in the FDX mode, the length of the first cyclic extension is long enough to accommodate the delay spread.

28. The access node according to claim 25, wherein the channel characteristic comprises a propagation delay and a delay spread, and the predetermined threshold is set in such a way that, when the remote transceiver is operated in the FDX mode, the length of the first cyclic extension is long enough to accommodate combined effects of the delay spread and the propagation delay.

29. The access node according to claim 25, wherein the channel characteristic comprises a loop length, and the predetermined threshold is pre-set based on prior knowledge or experience on how the loop length of the communication line translates to a length of the first cyclic extension required for the communication line.

* * * * *

UNITED STATES PATENT AND TRADEMARK OFFICE
CERTIFICATE OF CORRECTION

| | |
|---|---|
| PATENT NO. | : 11,095,423 B2 |
| APPLICATION NO. | : 16/376175 |
| DATED | : August 17, 2021 |
| INVENTOR(S) | : Jochen Maes |

It is certified that error appears in the above-identified patent and that said Letters Patent is hereby corrected as shown below:

In the Claims

Column 12 Line 1 in Claim 17, please replace "The access node according to claim 13," with --The access node according to claim 15,--.

Signed and Sealed this
Twenty-fifth Day of October, 2022

Katherine Kelly Vidal
*Director of the United States Patent and Trademark Office*